United States Patent [19]

Donchin

[11] Patent Number: 5,615,283
[45] Date of Patent: Mar. 25, 1997

[54] PATTERN RECOGNITION DEVICE

[75] Inventor: Dale R. Donchin, Framingham, Mass.

[73] Assignee: Digital Equipment Corporation, Maynard, Mass.

[21] Appl. No.: 311,841

[22] Filed: Sep. 23, 1994

Related U.S. Application Data

[63] Continuation of Ser. No. 874,730, Apr. 27, 1992, abandoned.

[51] Int. Cl.$^6$ ................................................ G06K 9/00
[52] U.S. Cl. ............................................. 382/187; 382/202
[58] Field of Search .................................. 382/13, 25, 24, 382/10, 48, 187, 188, 197, 198, 202, 209

[56] References Cited

U.S. PATENT DOCUMENTS

| | | | |
|---|---|---|---|
| 4,622,641 | 11/1986 | Stephens | 364/518 |
| 4,653,107 | 3/1987 | Shojima et al. | 382/13 |
| 4,686,522 | 8/1987 | Hernandez et al. | 340/709 |
| 4,718,103 | 1/1988 | Shojima et al. | 382/13 |
| 4,878,249 | 11/1989 | Mifune et al. | 382/13 |
| 4,896,291 | 1/1990 | Gest et al. | 364/900 |
| 4,937,564 | 6/1990 | Oberg | 340/706 |
| 4,984,152 | 1/1991 | Muller | 364/200 |
| 5,038,382 | 8/1991 | Lipscomb | 382/187 |

OTHER PUBLICATIONS

Chin–Hwa Lee and Gim Pew Quek, "Partial Matching of Two Dimensional Shapes Using Random Coding", 1988, pp. 64–68, Proceedings of the 1988 Ninth International Conference on Pattern Recongnition.

Hong, Jiawei and Tan, Xiaonan, "A New Approach to Point Pattern Matching", 1988, pp. 82–84, Proceedings of the 1988 Ninth International Conference on Pattern Recongnition.

*Primary Examiner*—Leo Boudreau
*Assistant Examiner*—Phuoc Tran
*Attorney, Agent, or Firm*—David A. Dagg; Denis G. Maloney; Arthur W. Fisher

[57] ABSTRACT

A pattern recognition device tracks the angular movements made by a pointing device such as a mouse in generating a pattern of lines. A pattern code is generated if the angular movements match those of a pattern code in a lookup table. The pattern matching for the shape is done without regard to size, is insensitive to expected variations in hand-drawn strokes, requires minimal computer processing and data storage, and can distinguish between identical patterns that differ only in the order in which their constituent line segments were drawn.

8 Claims, 10 Drawing Sheets

EXAMPLES OF STROKE TEXT

PATTERN          CLASSIFICATION

PATTERN RECOGNITION DEVICE

This application is a continuation of application Ser. No. 07/874,730, filed Apr. 27, 1992, now abandoned.

BACKGROUND OF THE INVENTION

This invention relates to a pattern recognition device and to a method of recognizing hand-drawn patterns, created with a computer digitizing mechanism, by tracking and classifying the angular motion of the mechanism in creating the patterns.

Known pattern recognition devices can store in computer memory, and operate on, a set of coordinate points that represent a hand-drawn "artifact." The artifact is an arbitrarily-drawn shape or stroke which signifies a letter, number, or other symbol which, in turn, can represent a command sequence or operation to be performed by the computer. The shape or stroke is represented by a series of coordinate points.

According to some prior art techniques, the coordinate points of a shape or stroke are classified into three groups, each of which incorporates a set of consecutive points. The first group, line segments, include those cases where the slope between a given subset of consecutive points and the line formed by the endpoints of the line segment does not exceed a pre-determined value. The second group, arcs, include those cases where that slope does exceed a pre-determined value; the third group includes those cases where it is ambiguous as to whether the set of points forms a line segment or an arc. The digitized coordinate points are then compared to a plurality of previously-recorded and similarly-represented patterns. Recognition is achieved by determination of the match of greatest similarity between the classification of the digitized points and previously defined patterns.

One problem with these prior art techniques is that the digitized sets of coordinate points are stored in their entirety before the representations of line segments, arcs, and cases where such a determination is ambiguous, are computed. This can require a significant amount of computer storage and increase the time needed for the comparison operation. Another problem with these prior art techniques can arise if no smoothing of the data occurs. Because the digitized set of coordinate points results from human hand motion, the exact set of coordinate points received and its subsequent classification can vary greatly with successive attempts to create the same pattern, even by the same individual. This can lead to poor success in correctly recognizing a hand-drawn pattern.

SUMMARY OF THE INVENTION

The invention relates to a dynamic (as opposed to static), software-implemented method of recognizing hand-drawn patterns created with a computer input device by tracking the movements used to draw the angles comprising the patterns. Specific patterns may represent command sequences or data that are more easily communicated to the computer through a hand-drawn shape rather than through traditional means such as a computer keyboard or, alternatively, may represent data.

In use, the computer may associate a command with a specific pattern. For example, the WRITE command of a particular computer application could be associated with the letter W. Once this association is established, the computer user can invoke the WRITE command by typing it as usual, or more quickly and easily by drawing the figure W using a work-station mouse.

One aspect of this invention is that it involves classifying a pattern "on the fly" as it is being drawn, thereby drastically minimizing computer storage requirements. The hand-drawn pattern includes a set of line segments that are digitized but not saved in their entirety. For example, storing only two of typically hundreds of digitized coordinate input data is a significant advantage of a method in accordance with the invention.

As with some prior art techniques, such a method recognizes as identical, patterns that are similar in shape but different in size or aspect ratio. The method of this invention can thus enable the user to draw a shape over a previously displayed set of graphics to indicate the portion of the graphics that is to be affected associated with the drawn pattern, e.g., for zoom-in or zoom-out of a portion of the display. For example, using a mouse, a user may draw a pattern in the shape of the letter Z over the area to be processed by the zoom operation. A larger Z may indicate a larger area to be processed while a smaller Z indicates a smaller area to be processed. Thus, the easily remembered letter Z for zoom matches both the large and small areas to be zoomed, but specifying different sizes of area to be affected by the zoom operation in each case.

Another advantageous aspect of the pattern recognition approach of this invention is the ability to recognize how a pattern is drawn. If the order of receipt of the line segments representing the same drawn pattern is different, the patterns are assumed to be non-identical. Thus, the same shape may be symbolically different by changing how it is drawn. This is particularly advantageous. Again using the example of drawing the letter Z, if the top of the Z is drawn first (from left to right), the slanted line segment second (from top to bottom), and the bottom line segment third (from left to right), then the resultant pattern will be classified differently than if a Z pattern resulted from drawing the bottom line segment first (from right to left), the slanted line segment second (from bottom to top), and the top line segment third (from right to left). Although either drawing sequence results in the shape of the letter Z, such a method will differentiate between the two. This feature makes it possible to either enlarge ("zoom-in function") or reduce ("zoom-out function") the size of the graphic data.

In similar fashion, data can be moved in a specific direction ("pan operation"). A single line segment drawn from left to right may indicate a pan right operation, a single line segment drawn from top to bottom may indicate a pan down operation, a single line segment from bottom to top may indicate a pan up operation, and a single line segment drawn from right to left may indicate a pan left operation. This feature is also particularly advantageous. Because line segments drawn in the same direction are recognized as being similar regardless of the length of the line segment, the amount of graphic data to zoom or pan can be established by the drawn length of the line segments (i.e., a longer line segment zooms or pans a greater amount).

In drawing the strokes, the human hand may not duplicate precisely the same pattern repeatedly or draw a perfectly straight line segment. Another advantage of such a method is the "smoothing" of such variations of the input coordinate data. Smoothing allows two patterns to be classified as identical when they differ only with regard to minor differences in each pattern's digitized coordinate data. Referring again to the pan example, such a method recognizes as identical single line segments drawn from left to right without regard to minor variations in the digitized coordinate data representing those line segments due to slight upwards or downwards motion while the mouse is moved.

A "match" is defined when two patterns share identically drawn shapes, as indicated by matching sequences of angles defining the shapes, but whose directed line segments forming those angles may vary within a preset tolerance to account for variations in human hand motion and where the size of the matched patterns may differ greatly.

With such a method, computer commands are easily assigned to readily drawn and user specified patterns. Execution of those commands only requires that a pattern be traced. This is particularly easy because a user uses a mouse or other pointing type input device. A long command takes a few seconds to correctly type on the keyboard. Scanning a hierarchy of menus to select a command also requires a second or two. However, with this invention, a command can be specified in under one second.

BRIEF DESCRIPTION OF THE DRAWINGS

The novel features believed characteristic of the invention are set forth in the appended claims. The invention itself, however, as well as other features and advantages thereof, will be best understood by reference to the detailed description of specific embodiments which follows, when read in conjunction with the accompanying drawings, wherein:

DETAILED DESCRIPTION OF SPECIFIC EMBODIMENTS

In an illustrative method in accordance with the invention, generation of an output signal that encodes a pattern of directed line segments "drawn" on a computer display with, e.g., a mouse or other cursor-movement device ("pattern recognition") is performed in two distinct phases. In phase 1, the digitized coordinate data is received, a coarse smoothing function is performed, and obvious discontinuities of the pattern are stored. In phase 2, a fine data smoothing operation is applied.

Figure 1:
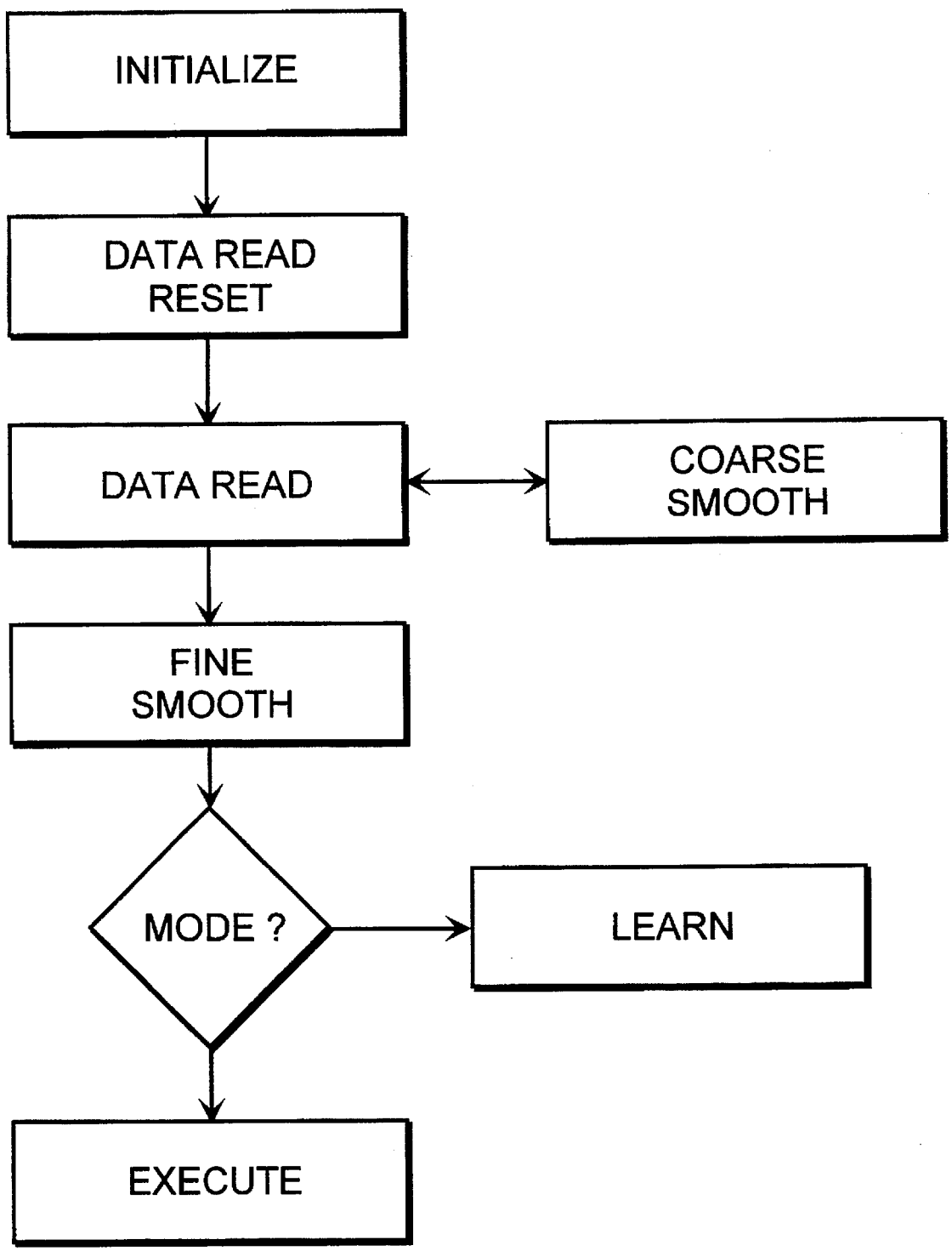
FIG. 1 is a flow chart depicting the overall processing system of a pattern recognizing device according to this invention.

If the pattern is being entered to associate a symbolic representation with that pattern of strokes ("Learn Mode"), the resultant classification of the pattern is stored in a machine-readable lookup table together with a "pattern code" such as a text string that represents the function associated with that pattern when it is subsequently redrawn. Otherwise, the drawn pattern is compared against previously stored patterns. If a match is found, the pattern's endpoints and associated pattern code are returned ("Execute Mode"). This overall processing is depicted by the flow diagram of FIG. 1.

Figure 10A:
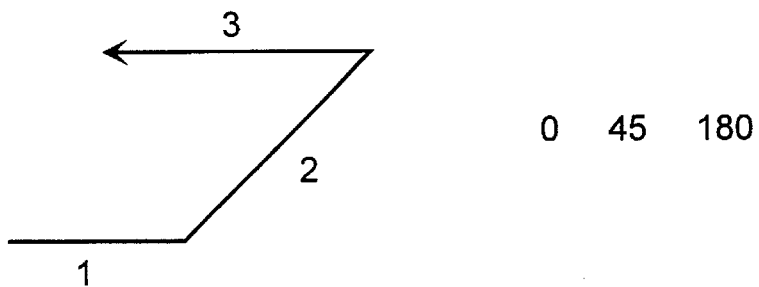
FIGS. 10a, 10b, and 10c show examples of pattern classification.
Figure 10B:
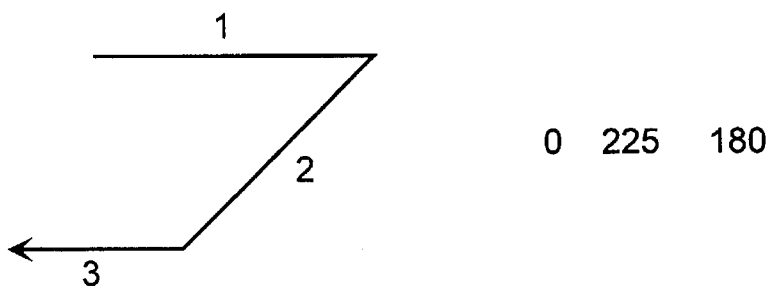
Figure 10C:

As illustrated in FIGS. 10a through 10c, patterns are classified according to the angles formed by the discontinuities inherent in the pattern's shape, without respect to size. The patterns of FIGS. 10a and 10b illustrate how patterns bearing similar shapes but drawn in different stroke order are distinctly classified. The pattern in FIG. 10c demonstrates that the size of the pattern does not affect its classification. It is classified the same as the second pattern despite its smaller size. The endpoints of the drawn pattern are used in conjunction with the classification to differentiate between the second and third patterns.

Figure 2A:
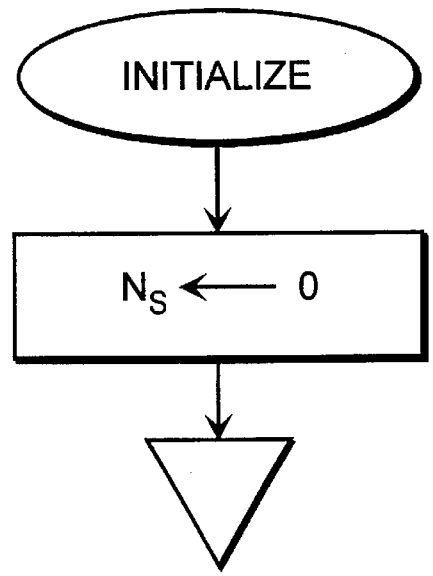
FIGS. 2a and 2b are flow charts depicting the initialization of variables.
Figure 2B:
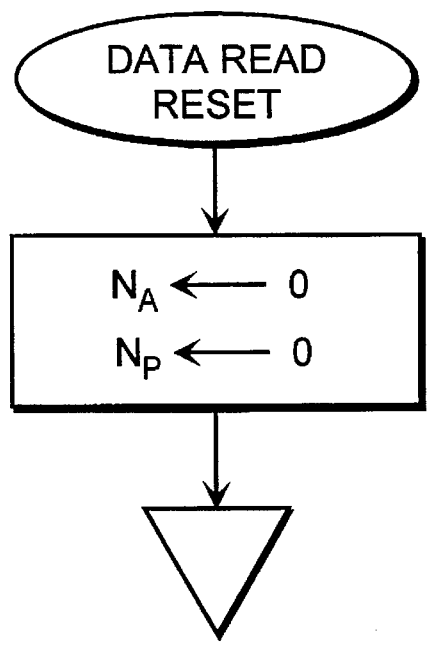

In more detail, referring to FIGS. 2a and 2b, global initialization results in the variable $N_S$, representing the number of learned patterns, being set to zero. A local set of variables, $N_A$, representing the number of disjoint line segments detected per pattern, and $N_P$, a count of digitized coordinate data read per group per input pattern, are initialized to zero before each pattern is digitized.

Figure 3:
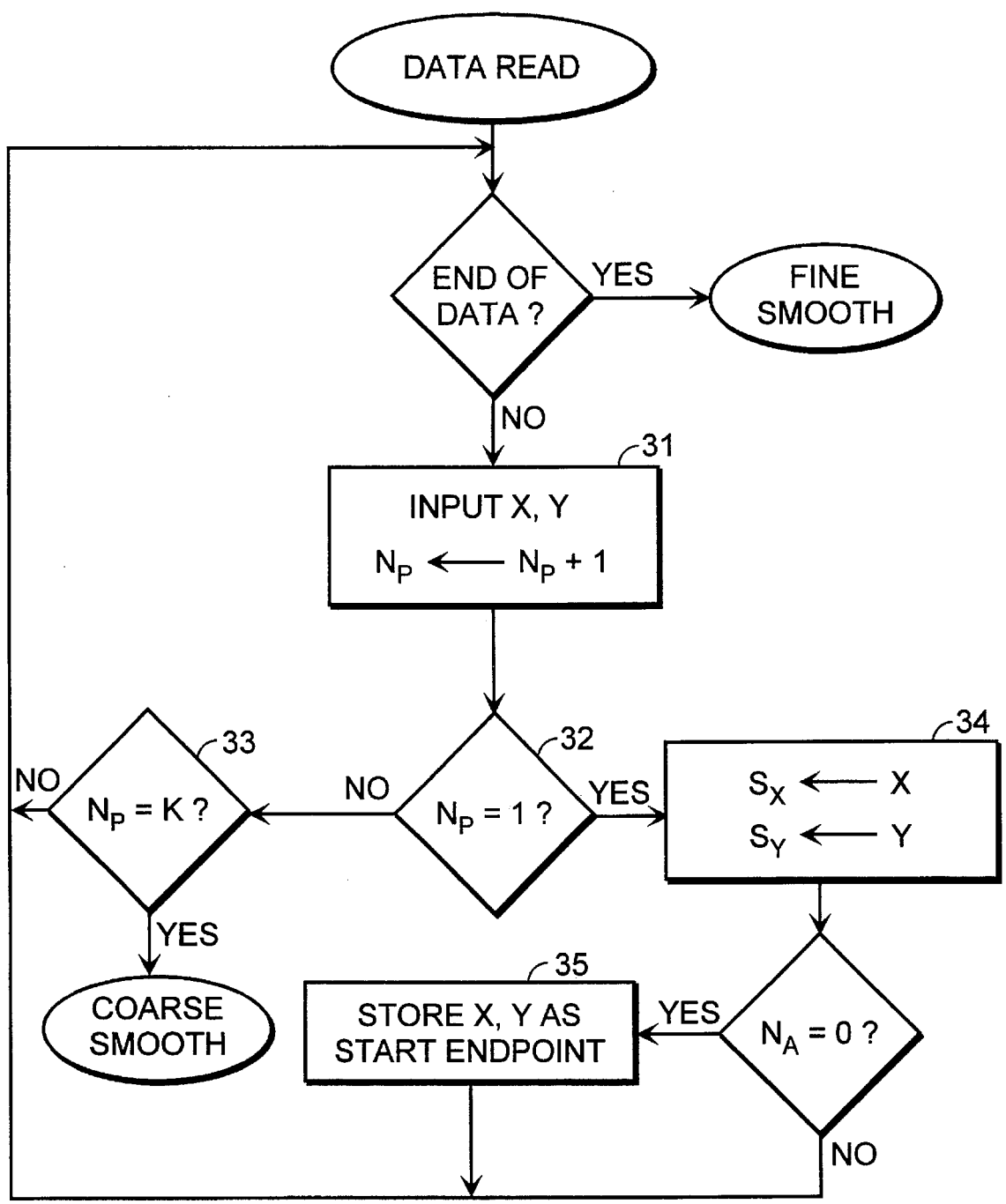
FIG. 3 is a flow chart representing the steps in a method of generating a sequence of coordinate points representing human hand motion.

Referring to FIG. 3, a source of digitized coordinate data such as a mouse (or equivalently a pen, joystick, track ball, arrow keys, etc.), is used in any convenient manner, e.g., by holding down a mouse button, to generate a sequence of points, expressed in (X,Y) notation. These points, displayed on a computer display, can be thought of as representing human hand motion in drawing a pattern. Step 31 is executed once per coordinate data point (X,Y) digitized. Step 32 and Step 33 are used to group together a predetermined (K) number of consecutive data points. To aid in smoothing, only the first (Step 32) and last (Step 33) data points of each group of size K are processed. The effect of the data grouping is a reduction in computer storage requirements. The constant K is determined according to the digitization rate.

In Step 34, the first data point of each group is recorded as $S_X$ and $S_Y$. In Step 35, the first coordinate data point received per pattern is stored as the initial endpoint of the pattern.

When K number of coordinate data values have been received, a coarse smoothing operation further accounts for minor variations in the free-hand strokes. The purpose of the coarse smooth function is to smooth sufficiently the input data to ensure that significant changes in the pattern's direction, signifying the start of a new line segment, are readily detected and not confused by imperfections in hand-drawn strokes.

This coarse smoothing function is accomplished by calculating the angle of the current directed line segment, with respect to a reference axis (e.g., an imaginary x-axis on the computer display), at every Kth coordinate point and by appending a representation of that angle to a sequentially ordered list of angles maintained in addressable storage. Two line segments are considered to be disjoint when their angles diverge by at least $\phi$ degrees; a value of $\phi$ of approximately 30° has been found to be effective. If the line segment is drawn fairly straight, each angle calculation will differ only slightly from the preceding calculation. The coarse smooth function averages the calculated anglesto smooth out minor differences.

The coarse smoothing function also assigns a strength value that records the number of occurrences of angles that are approximately the same. This aids in later filtering out extremely short line segments, e.g., with a strength of 1, resulting from nervous twitches and other erroneous data glitches. That is, when an angle $A_i$ differs from both its predecessor $A_{i-1}$ and its successor $A_{i+1}$ by more than a specified difference $\Theta$ (which in practice may be same as the specified difference $\phi$), then angle $A_i$ is regarded as a product of noise.

Figure 4:
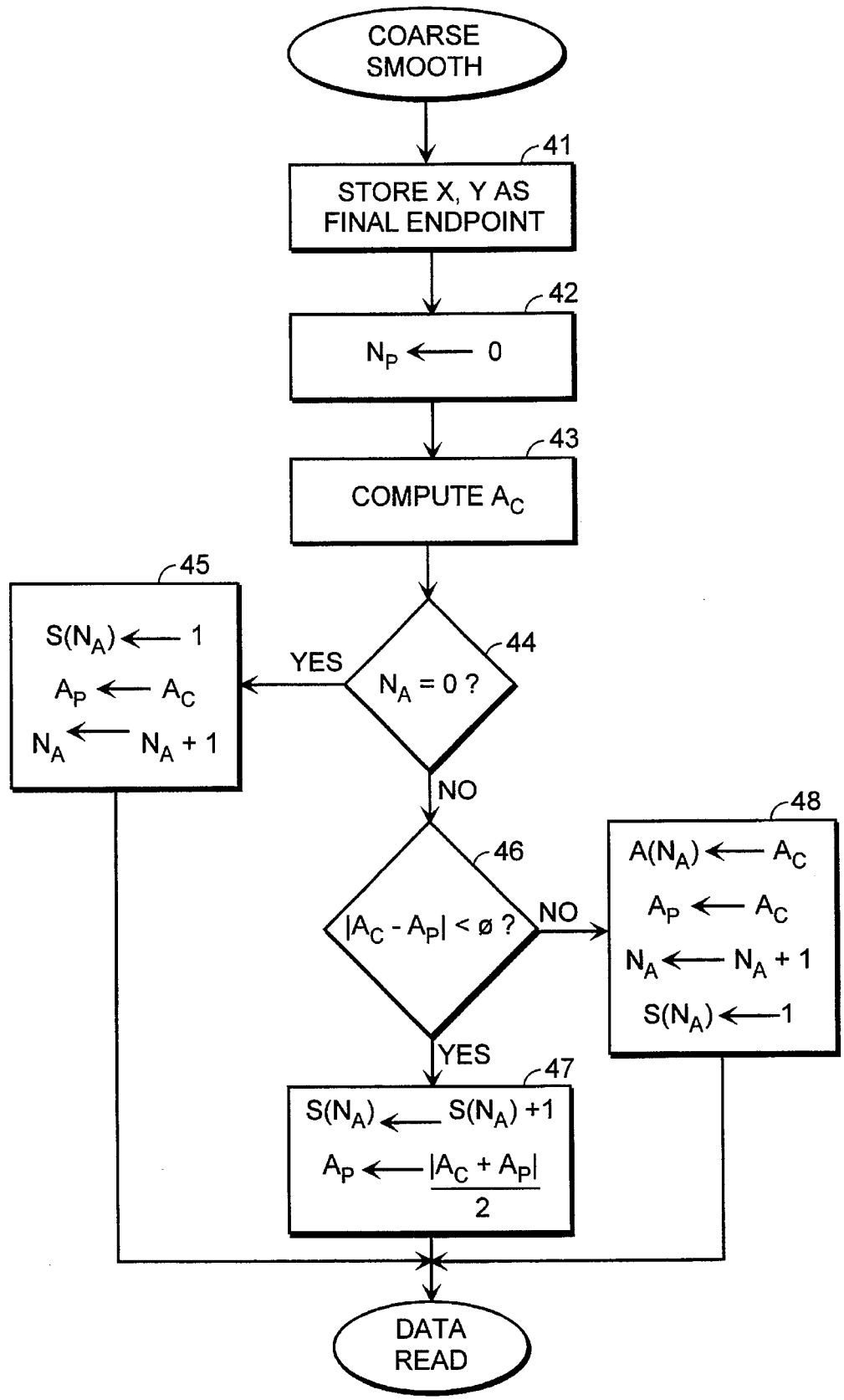
FIG. 4 is a flow chart representing the steps in a method of generating the coarse smooth function.

The operational details of the coarse smooth function are illustrated in FIG. 4. In Step 41, the most recently received coordinate data is stored assuming that it represents the final endpoint of the input stroke. This will be the case if fewer than K number of coordinate values are subsequently received. Otherwise, $N_A$ is overwritten for each of the remainder of the group of K digitized values, resulting in a final endpoint that closely tracks the strokes as they are entered. The counter $N_P$ is reset to zero in Step 42 to begin accumulating the next K data points.

In Step 43, the current angle $A_C$, with respect to the x-axis, of the line segment drawn thus far, is calculated as follows:

$$A_C = \arccos\left(\frac{X - S_X}{\sqrt{(X - S_X)^2 + (Y - S_Y)^2}}\right)$$

Step 44 determines whether this is the first angle computed for this pattern. If so, initialization of the "strength" of this angle, $S(N_A)$ (discussed below), and of the prior angle calculated, $A_P$, occurs in Step 45. If not, in Step 46, the current angle $A_C$ is compared against the previously calculated angle $A_P$. If these two angles differ by less than $\phi$ degrees, they are considered to have resulted from the same line segment. Accordingly, in Step 47, a new $A_P$ is computed as the average of the current $A_C$ and $A_P$, and the strength is incremented. Otherwise, in Step 48, a new line segment is initialized and the count of line segments detected for this pattern is advanced.

When the end of the coordinate data is signalled, typically through depression of a pre-defined mouse button, program control is passed to the fine smooth function. The fine smooth function is executed upon completion of the drawn strokes. This function examines the strength of each line segment. Line segments with a strength of exactly 1 are considered to be the result of the nervous twitches and other discrepancies in drawing a straight line and are treated as noise and, therefore, eliminated from the pattern's classification. Once the noise is removed, any consecutive angles that differ by less than $\phi$ are merged. The result of the fine smooth operation is a sequence of angles, forming a unique pattern classification, that describe the pattern according to the angles of each of the pattern's adjoining line segments.

Figure 5:
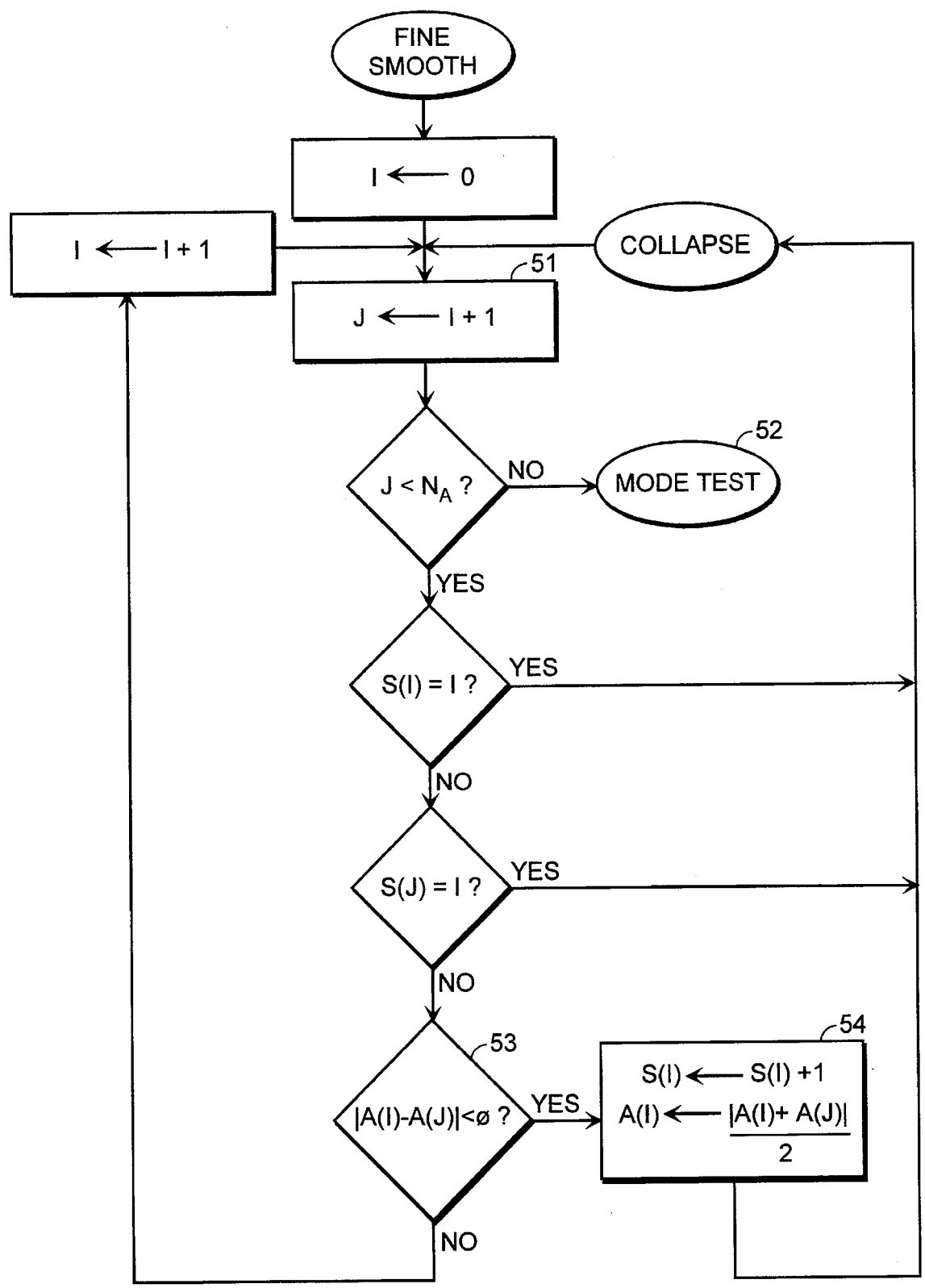
FIG. 5 is a flow chart representing the steps in a method of generating the fine smooth function.
Figure 6:
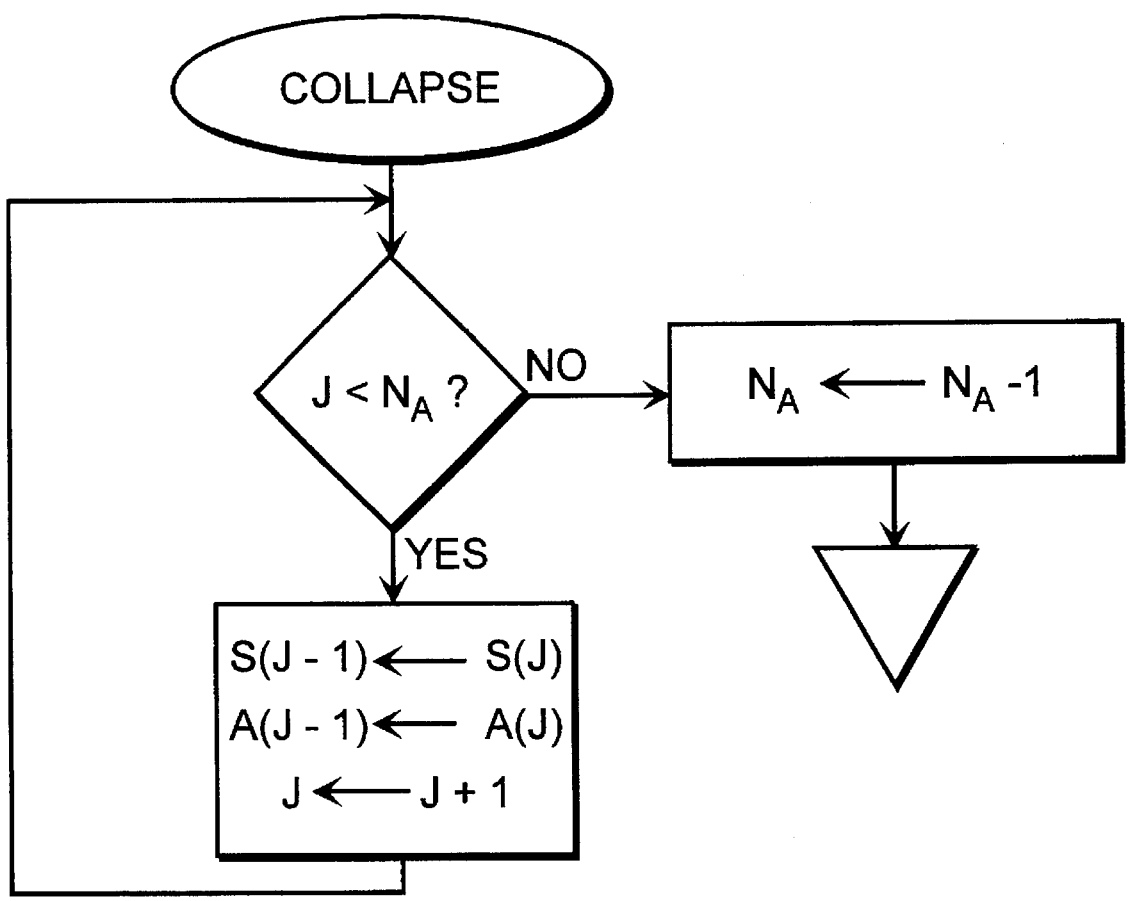
FIG. 6 is a flow chart representing the steps in a method of generating the collapse function.

The fine smooth function is depicted in FIG. 5. Step 51 is a loop that successively examines the strengths of each angle. The loop continues until Step 52 is reached. Any angles that have a strength of exactly 1, indicative of a single noise error, are eliminated during a collapse operation. Since a noise sample may interrupt a line segment, the angles calculated on either side of the noise are examined in Step 53 to determine if these angles belong to the same line segment. If so, they are merged in Step 54. Then, the pattern classification is collapsed. FIG. 6 shows the collapse routine.

When an initialization mode pattern is completed, the user indicates to the system the operation to be performed. This can be accomplished, e.g., by depressing one of two or three buttons on the mouse that was used to draw the pattern or by other conventional means. One of two operations, or modes, can be selected—"Learn" mode or "Execute" mode.

Figure 7:
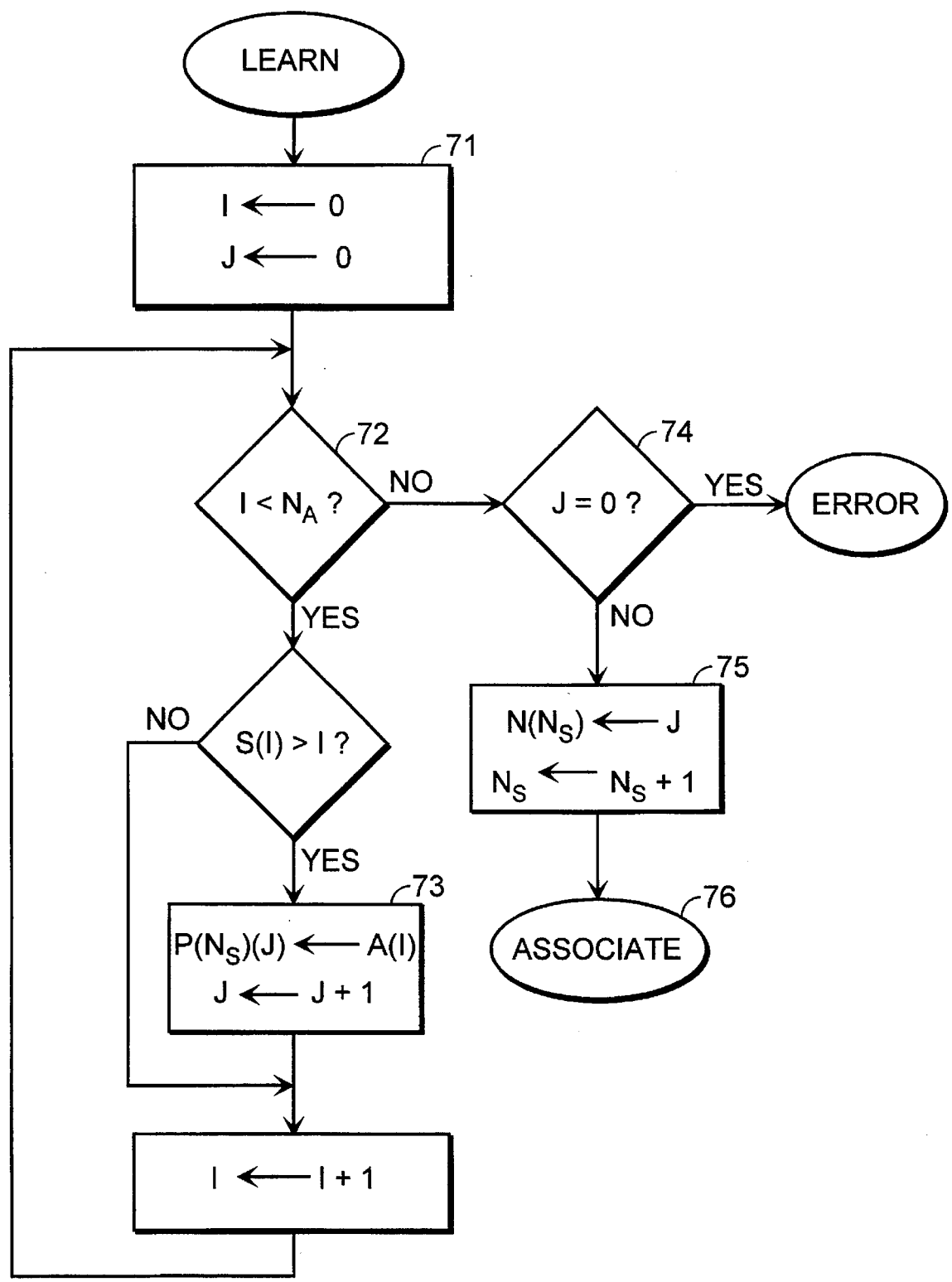
FIG. 7 is a flow chart representing the steps in a method of associating a symbolic representation with pattern strokes.

Learn Mode is depicted in FIG. 7. In this mode, a pattern code, input by the user, is associated with the pattern to enable pattern code substitution when a similarly classified pattern is later drawn. The pattern code may represent a command to the system that is more easily expressed through the drawing of a unique pattern than by entering the text through the computer keyboard.

In Step 71, two loop counters I and J are initialized. I represents the total number of angles examined; J represents the number of angles with strength greater than 1. The loop ensures that each angle has a strength greater than 1. The loop is terminated in Step 72 after all angles have been examined. Angles that pass the strength test are stored in Step 73. In Step 74, an error is generated if each of the pattern's angles have a strength equal to 1. Otherwise, in Step 75, the total number of angles having a strength greater than 1 is stored and a counter representing the number of learned patterns is incremented.

Step 76 handles the association of the pattern code with the newly learned pattern. The pattern recognizing device described herein makes no assumptions about the pattern code or its intended purpose.

A possible outcome of Learn Mode is an error that results from insufficient or erroneous input data. The user is instructed to redraw the pattern if this error occurs.

Figure 8:
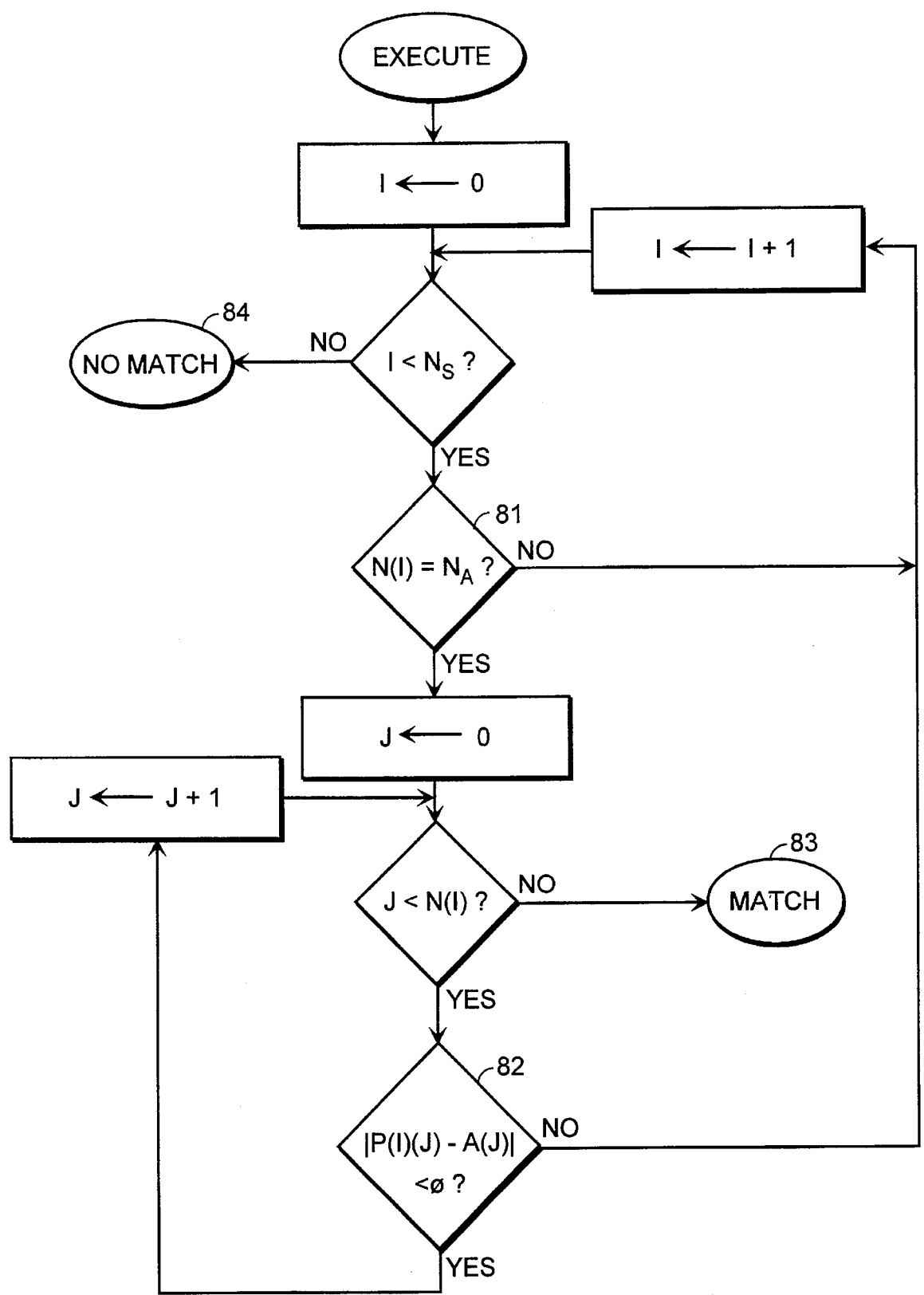
FIG. 8 is a flow chart representing the steps in a method of comparing a drawn pattern with previously stored patterns.
Figure 9:
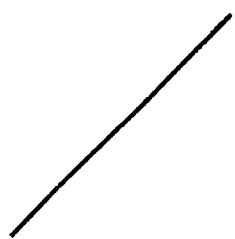
FIG. 9 shows examples of stroke text.
Figure 9:
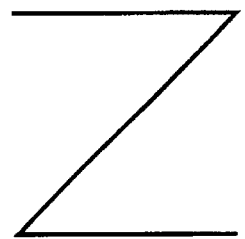
Figure 9:
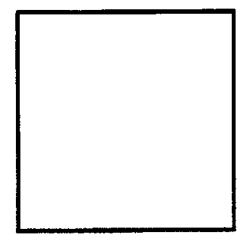
Figure 9:
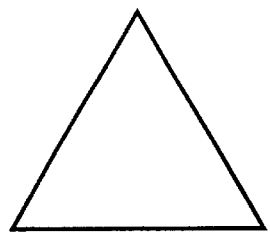
Figure 9:
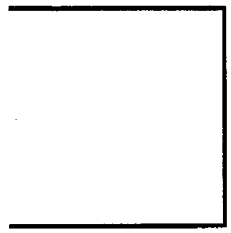
Figure 9:
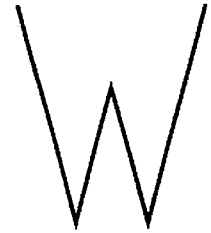
Figure 9:
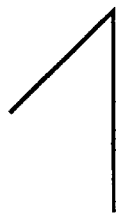
Figure 9:
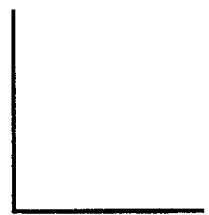
Figure 9:
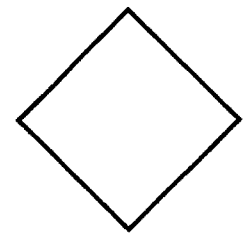
Figure 9:

The other mode is Execute Mode, shown by FIG. 8. In this mode, a search function predominates. The pattern, having been classified by this pattern recognizing device, is compared against patterns that were previously entered in Learn Mode. For a match to be declared, the number of angles (Step 81) of the recently entered pattern must equal that of the learned pattern. Also, each successive angle of the recently entered pattern must fall within a pre-set tolerance $\tau$ of its corresponding angle of the learned pattern. If a match occurs between the recently entered pattern and a prior one, the text string that was associated with that prior pattern is returned (Step 83). Because this device will recognize two patterns as being alike if they resemble each other in shape although they are of different size, the endpoints of the recently drawn pattern are also returned, thus enabling a determination of what portions of the display are "covered" by the pattern. A separate return is executed if no match occurs (Step 84).

The illustrative method described in this invention could readily organize the saved patterns and pattern codes so as to optimize the search and compare operations. For smaller collections of patterns, the overhead costs of optimization probably outweighs the performance benefits.

An extension of the illustrative method involves tracking selective successive slopes between subsets of points; this permits determining the size and shape of an arc-type pattern.

What is claimed is:

1. A machine executed method of generating an output signal encoding a hand drawn pattern forming one or more disjoint, connected, directed line segments drawn sequentially on a computer display, said method comprising the steps of:

(a) allocating addressable storage for an angle list, referred to as angle-list storage;

(b) sampling strokes of said hand drawn pattern to produce a series of digitized drawn points, each said drawn point having coordinates with respect to a reference coordinate system for said display;

(c) storing in said angle-list storage a list of the respective angles of each said line segment with respect to a directed reference axis of said display, referred to as an angle list, said storing step comprising the substeps of:

(1) declaring the coordinates of an initial said drawn point as the coordinates of a line segment starting point;

(2) determining a current angle $A_C$, with respect to the directed reference axis, of a directed subsegment having as its endpoints (A) the line segment starting point and (B) the Kth drawn point after the line segment starting point;

(3) if the value of the current angle $A_C$ differs from the value of a previous angle $A_P$ by more than a specified nominal difference $\phi$, where the initial value of said previous angle $A_P$ is equal to the current angle $A_C$, then (A) appending the value of the current angle $A_C$ to said angle list in said angle-list storage, and (B) replacing the value of the angle $A_P$ with the value of the current angle $A_C$; and (4) repeating steps (c)(2) through (c)(3) for each successive set of K consecutive drawn points;

(d) searching a lookup table stored in a memory for a match with the angle list stored in step (c) above, said lookup table comprising (A) a set of pattern codes each representing a specified pattern of line segments, and (B) for each said pattern code, a list of angles of the specified pattern of line segments represented by the pattern code; and (e) if a match is found in step (d) above, then generating a signal encoding the matched pattern code, else generating a NO-MATCH signal.

2. A method according to claim 1, wherein said storing step (c) further comprises the substeps of:

(c)(5) deleting from the angle list any values of angles corresponding to noise; and (c)(6) replacing any two consecutive values in the angle list that differ by less than a specified difference $\phi$ with a single value that approximates an average of said two consecutive values.

3. The method of claim 2, wherein the value of an angle $A_i$ is deleted from the list in step (c)(5) if it differs both from the value of a previous angle $A_{i-1}$ and from the value of a successor angle $A_{i+1}$ by more than a specified difference $\Theta$.

4. The method of claim 1, wherein a match, in the search of step (d), between the angle list and a candidate angle list in the lookup table is defined as occurring if (A) the mumbet of angle values in the angle list is equal to the number of angle values in the candidate angle list, and (B) each successive angle in the angle list differs from the corresponding angle in the candidate angle list by no more than a specified tolerance $\tau$.

5. A machine executed method of generating an output signal encoding a hand drawn pattern, said method comprising the steps of:

(a) allocating addressable storage for an angle list, referred to as angle-list storage;

(b) sampling strokes of said hand drawn pattern to produce a series of drawn coordinate points;

(c) storing in said angle-list storage an ordered list of the respective angles of each line segment in said hand drawn pattern, with respect to a directed reference axis of a display, referred to as an ordered angle list, said storing step including the substeps of:

(1) declaring the coordinates of an initial drawn point as the coordinates of a line segment starting point;

(2) determining a current angle $A_C$, with respect to the directed reference axis, of a directed subsegment having as its endpoints (A) the line segment starting point and (B) the Kth drawn point after the line segment starting point;

(3) if the value of the current angle $A_C$ differs from the value of a previous angle $A_P$ by more than a specified nominal difference $\phi$, where the initial value of the previous angle $A_P$ is equal to the current angle $A_C$, then (A) appending the value of the current angle $A_C$ to the ordered angle list, and (B) replacing the value of the angle $A_P$ with the value of the current angle $A_C$; and (4) repeating steps (c)(2) through (c)(3) for each successive set of K consecutive drawn points;

(5) deleting from the ordered angle list any value of an angle $A_i$, if it differs both from the value of a previous angle $A_{i-1}$, and from the value of a successor angle $A_{i+1}$ by more than a specified difference $\Theta$; and (6) replacing any two consecutive values in the ordered angle list that differ by less than a specified difference $\phi$ with a single value that approximates an average of said two consecutive values;

(d) searching a lookup table stored in a memory for a match with the ordered angle list stored in step (c) above, (1) said lookup table comprising (A) a set of pattern codes each representing a specified pattern of line segments, and (B) for each said pattern code, a list of angles of the specified pattern of line segments represented by the pattern code, referred to as a candidate angle list, (2) a match being is defined as occurring if (A) the number of angle values in the ordered angle list is equal to the number of angle values in the candidate angle list, and (B) each successive angle in the ordered angle list differs from the corresponding angle in the candidate angle list by no more than a specified tolerance $\tau$; and (e) if a match is found in step (d) above, then generating a signal encoding the matched pattern code, else generating a NO-MATCH signal.

6. A program storage device readable by a machine and having a program of instructions executable by the machine to perform the steps of claim 5 stored thereon.

7. A machine executed method of generating an output signal encoding a hand drawn pattern, said method comprising the steps of:

(a) sampling strokes of a hand drawn pattern to produce a series of drawn coordinate points;

(b) storing an ordered list of the respective angles of each line segment within said hand drawn pattern, with respect to a directed reference axis of a display, referred to as an ordered angle list, each angle in said ordered angle list having an associated strength value, said storing step including the substeps of:

(1) declaring the coordinates of an initial drawn point as the coordinates of a line segment starting point;

(2) determining a current angle $A_C$, with respect to the directed reference axis, of a directed subsegment having as its endpoints (A) the line segment starting point and (B) the Kth drawn point after the line segment starting point;

(3) if the value of the current angle $A_C$ does not differ from the value of a previous angle $A_P$ by more than a specified nominal difference $\phi$, then (A) replacing the value of the angle $A_P$ with the average of angle $A_C$ and angle $A_P$ and (B) incrementing by 1 a strength value associate with angle $A_P$;

(4) if the value of the current angle $A_C$ differs from the value of a previous angle $A_P$ by more than said specified nominal difference $\phi$, then appending the value of the current angle $A_C$ to the ordered angle list; and (5) repeating steps (b)(2) through (b)(4) for each successive set of K consecutive drawn points;

(c) deleting those angles in said ordered angle list having a strength value equal to 1;

(d) searching a lookup table stored in a memory for a match with the ordered angle list stored in step (b); and (e) if a match is found in step (d) above, then generating a signal encoding the matched pattern code, else generating a NO-MATCH signal.

8. The method of claim 7 further comprising performing steps (b)(2) through (b)(4) for each pair of consecutive angles in said ordered angle list after performing step (c).

* * * * *